United States Patent
Belevski (10) Patent No.: US 12,262,814 B2
(45) Date of Patent: Apr. 1, 2025

(54) STORAGE SHELF MOVING DEVICE AND SYSTEM

(71) Applicant: Ingram Book Group LLC, LaVergne, TN (US)

(72) Inventor: Zoran Belevski, LaVergne, TN (US)

(73) Assignee: Ingram Book Group LLC, LaVergne, TN (US)

( * ) Notice: Subject to any disclaimer, the term of this patent is extended or adjusted under 35 U.S.C. 154(b) by 0 days.

(21) Appl. No.: 18/777,638

(22) Filed: Jul. 19, 2024

(65) Prior Publication Data

US 2025/0024944 A1    Jan. 23, 2025

Related U.S. Application Data

(60) Provisional application No. 63/527,645, filed on Jul. 19, 2023.

(51) Int. Cl.
A47B 96/02     (2006.01)
B60B 33/06     (2006.01)

(52) U.S. Cl.
CPC .......... *A47B 96/021* (2013.01); *B60B 33/063* (2013.01); *A47B 96/025* (2013.01)

(58) Field of Classification Search
CPC .... A47B 96/021; A47B 96/025; B60B 33/063
See application file for complete search history.

(56) References Cited

U.S. PATENT DOCUMENTS 5,716,186 A * 2/1998 Jensen ................ B60B 33/0063
                                                     187/244
11,161,718 B2 * 11/2021 DeBattiste ................ B66F 3/24

FOREIGN PATENT DOCUMENTS

| CN | 214855432 U | 11/2021 |
|----|-------------|---------|
| CN | 215190116 U | 12/2021 |
| CN | 217014564 U | 7/2022 |
| CN | 217658700 U | 10/2022 |
| JP | 2002119339 A | 4/2002 |

OTHER PUBLICATIONS

International Search and Written Opinion of corresponding patent application No. PCT/US2024/038713, dated Oct. 23, 2024, 9 pages.

* cited by examiner

*Primary Examiner* — Bryan A Evans
(74) *Attorney, Agent, or Firm* — Patterson Intellectual Property Law, PC (57) ABSTRACT

A storage shelf moving device is disclosed herein and may include a plurality of moving devices. Each of the plurality of moving devices includes a main body and a wheel assembly. The main body includes an elongate portion and an end plate oriented substantially perpendicular to the elongate portion. The elongate portion may be operable to selectively couple to the storage shelf. The wheel assembly may be coupled to the main body and include an extendable support and a wheel rotatably mounted at a lower end of the extendable support. The storage shelf moving system may be operable to lift the storage shelf from the ground surface when the extendable supports of each of the plurality of moving devices are extended.

15 Claims, 10 Drawing Sheets

FIG. 12

STORAGE SHELF MOVING DEVICE AND SYSTEM

CROSS-REFERENCES TO RELATED APPLICATIONS

This application claims benefit of U.S. Provisional Patent Application No. 63/527,645, filed Jul. 19, 2023, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to modular storage shelves. More particularly, the present disclosure pertains to a storage shelf moving device and system configured to be selectively coupled to and move modular storage shelves.

BACKGROUND

Figure 1:
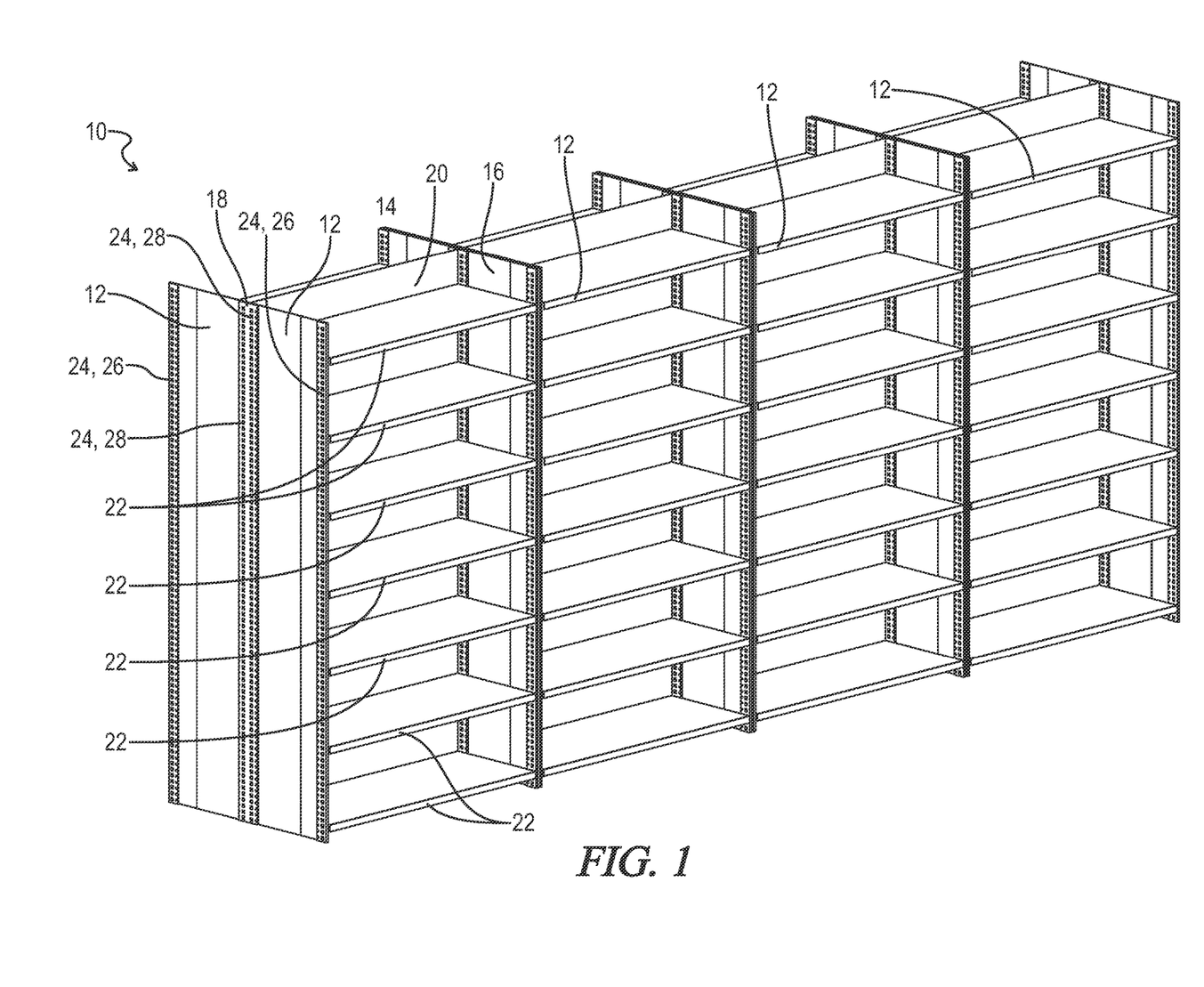
FIG. 1 is a perspective view of a conventional modular storage shelf.

Many facilities, such as warehouse-based fulfillment facilities for example, use modular storage shelves for storing and organizing goods. Referring initially to FIG. 1, one example of a conventional modular storage shelf is shown and generally designated by the number 10. The conventional modular storage shelf 10 may be referred to herein as simply a storage shelf.

The modular storage shelf 10 may include a shelving unit 12, alone or as a plurality of shelving units 12. Each shelving unit 12 may be operable to be coupled to other shelving units 12 to define a modular storage shelf 10.

Each shelving unit 12 may include a left side 14, a right side 16, a rear side 18 opposite an open front side 20, and a plurality of shelves 22.

The left side 14 of the shelving unit 12 may be operable to be selectively coupled to the right side 16 of another shelving unit 12.

The right side 16 of the shelving unit 12 may be operable to be selectively coupled to the left side 14 of another shelving unit 12.

The rear side 18 of the shelving unit 12 may be operable to be selectively coupled to the rear side 18 of another shelving unit 12.

Each of the plurality of shelves 22 may extend from the left side 14 to the right side 16 of the shelving unit 12.

The shelving unit 12 may include a plurality of holes 24 at least operable to couple the shelving unit 12 to other shelving units 12. The plurality of holes 24 may be aligned in rows.

A forward row 26 of holes 24 may be closer to the open front side 20 than to the rear side 18.

A rearward row 28 of holes 24 may be closer to the rear side 18 than to the open front side 20.

The forward and rearward rows 26, 28 of holes may be defined through both the left side 14 and right side 16 of the shelving unit.

Certain embodiments of the shelving unit 12 may include more than the forward and rearward rows 26, 28 of holes 24, or simply a different hole configuration altogether.

As warehousing needs change, these storage shelves 10 are often moved throughout a facility. However, storage shelves 10 are often large and cumbersome, making it impractical to move the storage shelves 10 while assembled. Thus, workers must remove the goods from the storage shelves 10, disassemble the storage shelves 10, transport the storage shelves 10 to a target location, reassemble the storage shelves 10, and repopulate the goods back on the storage shelves 10.

Disassembling the storage shelves 10 may involve decoupling the individual shelving units 12 from one another. This process presents ergonomic issues, requiring time and manpower to adjust the configuration of the storage shelves within a facility.

Further, the goods removed from the modular storage shelves 10 must be transported separately from, and in addition to, the modular storage shelves 10. This adds additional steps to an already laborious process.

BRIEF SUMMARY

In view of at least some of the above-referenced problems in conventional modular storage shelves, an exemplary object of the present disclosure may be to provide a new and improved storage shelf moving device and system configured to selectively couple to modular storage shelves and enable users to easily move the modular storage shelves. This allows shelving units, alone or coupled together, to be moved relatively efficiently with minimal disruption to operations by removing the need to re-warehouse product, disassemble the storage units, re-assemble the storage units, and return the re-warehoused product onto the newly assembled storage units.

Devices and systems according to the present disclosure may preferably instead be attached to existing storage shelves, vertically lift the storage shelves, and enable lateral movement of the storage shelves (e.g., comprising a plurality of storage units coupled together) into the proper location for final placement.

Devices and systems according to the present disclosure may preferably be used to transport storage shelves either with or without product in situ.

Devices and systems according to the present disclosure differ from conventional tools at least in that they can be easily attached to, and detached from, storage units with readily available fastening hardware (e.g., bolts and nuts).

With relative ease, the storage units may be vertically lifted to the needed height in order to have the clearance to allow lateral movement. This lateral movement may for example be enabled by a swivel wheel/caster.

The modular nature of a system as disclosed herein means that the number of individual modules being used can be changed based on the needs of the specific project, including but not limited to for example the size of shelving unit to be moved or a number of shelving units coupled together.

In an embodiment as disclosed herein, an exemplary storage shelf moving system may include a plurality of moving devices. Each of the moving devices may include a main body and a wheel assembly.

The main body may have an elongate portion and an end plate, at least part of the end plate oriented substantially perpendicular to the elongate portion. The elongate portion may be operable to selectively coupled to the storage shelf.

A wheel assembly may be coupled to the main body and include an extendable support and a wheel rotatably mounted at a lower end of the extendable support.

The storage shelf moving system may be operable to lift the storage shelf from the ground surface when the extendable supports of each of the plurality of moving devices are extended. The extendable supports may for example be actuated for lifting of the storage shelf using a hand driven jack or an equivalent thereof, or in other embodiments using alternative motive forces (e.g., hydraulics, pneumatics, etc.).

Numerous objects, features and advantages of the embodiments set forth herein will be readily apparent to those skilled in the art upon reading of the following disclosure when taken in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "coupled", "connected", "attached", "joined", "mounted", "fastened", and the like, unless otherwise specifically noted herein, should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

To the extent that the term "includes" or "including" is used in the specification or the claims, it is intended to be inclusive in a manner similar to the term "comprising" as that term is interpreted when employed as a transitional word in a claim.

To the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the terms "in" or "into" are used in the specification or the claims, it is intended to additionally mean "on" or "onto."

To the extent the term "connect" is used in the specification or claims, it is intended to mean not only "directly connected to," but also "indirectly connected to" such as connected through another component or multiple components.

Referring now to the drawings and particularly to FIGS. 2A-12, a storage shelf moving device is shown and generally designated by the number 100. The storage shelf moving device 100 may also be referred to herein as a moving device 100.

Figure 2A:
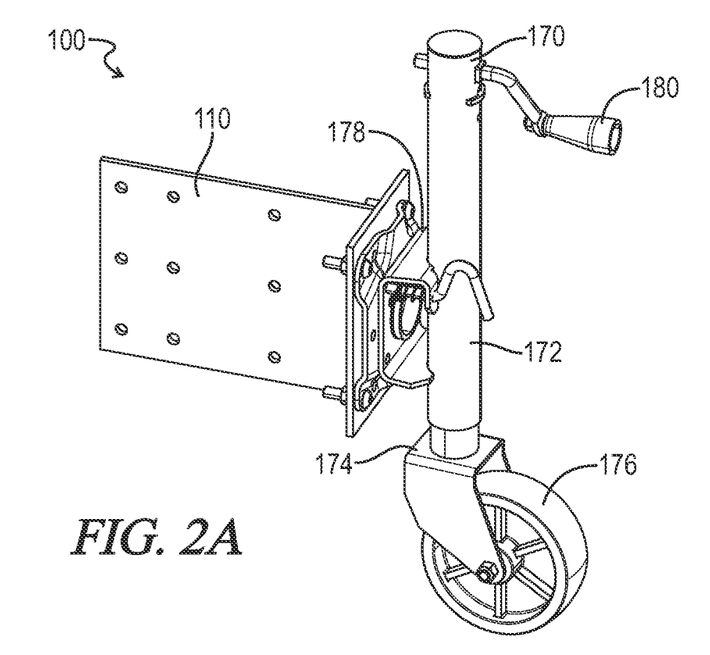
FIG. 2A is a perspective view of an exemplary embodiment of a storage shelf moving device having a T-section in accordance with the present disclosure.

The moving device 100 as represented in FIG. 2A may include a main body 110 defining one or more T-sections 110.

Figure 2B:
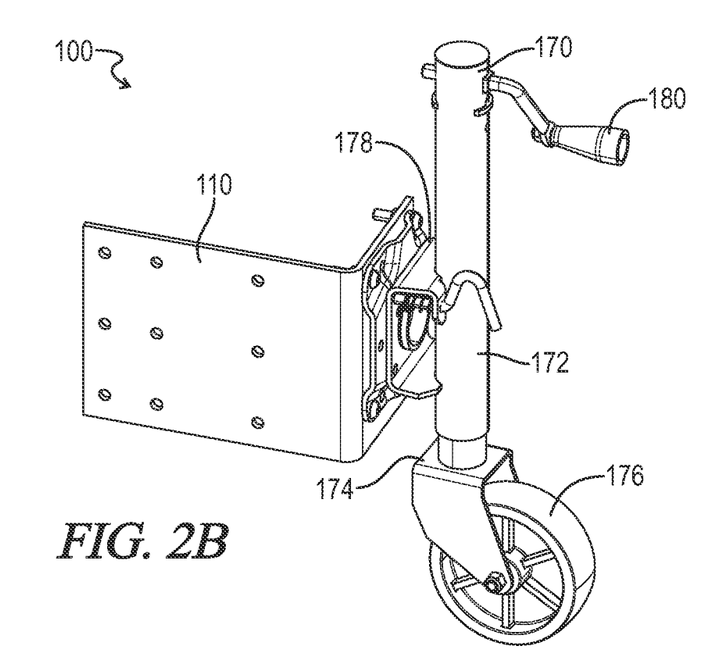
FIG. 2B is a perspective view of another exemplary embodiment of a storage shelf moving device in accordance with the present disclosure.

Another embodiment of the moving device 100 as represented in FIG. 2B may include a main body 110 defining one or more L-shaped sections.

A system as disclosed herein may include a plurality of moving devices 100, one or more of the plurality of moving devices 100 defining T-sections and one or more of the plurality of moving devices 100 defining L-sections, wherein appropriately configured moving devices may be selected for a given application.

Figure 3:
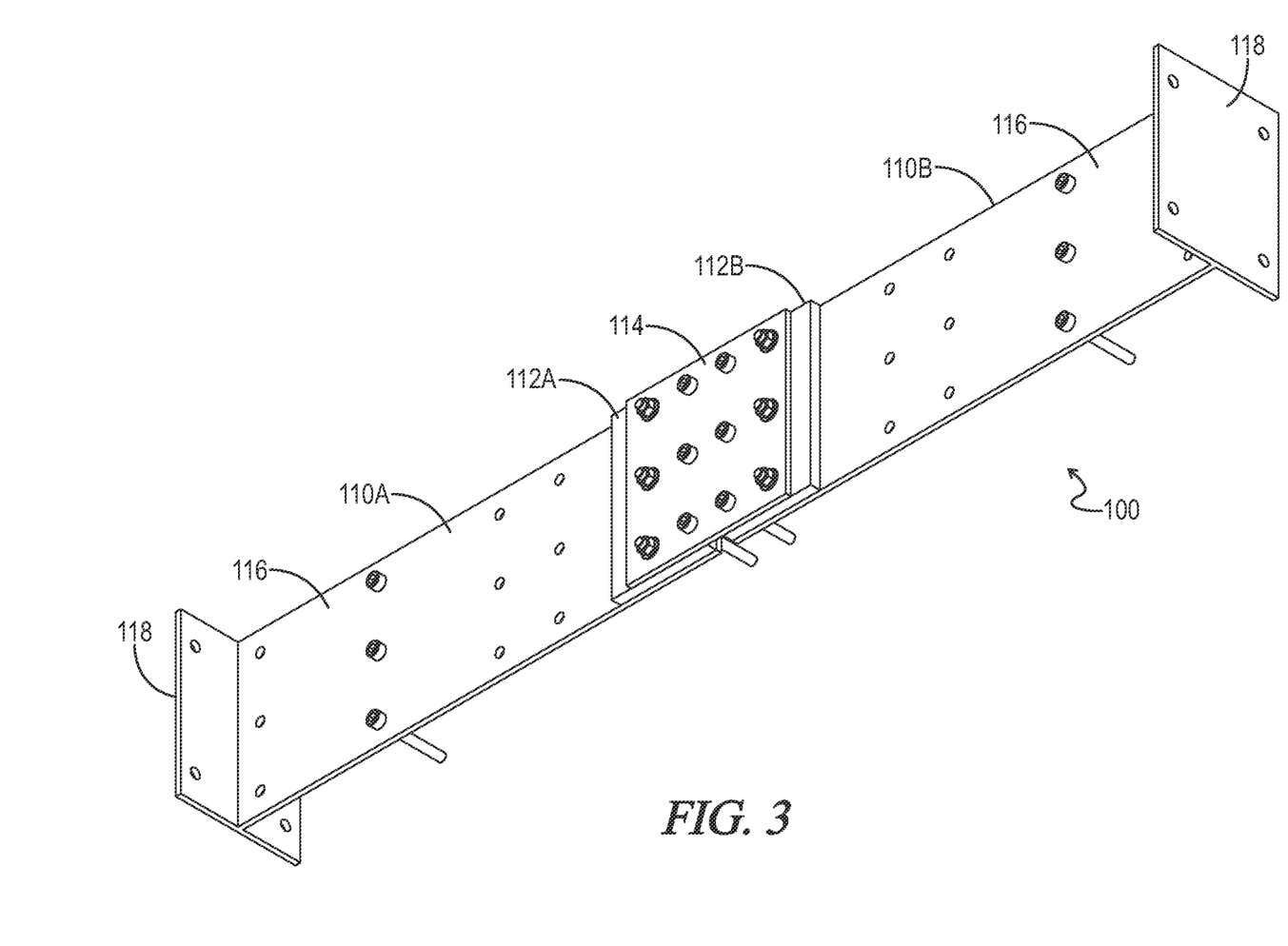
FIG. 3 is a perspective view of another exemplary embodiment of the storage shelf moving device in accordance with the present disclosure.

As represented in FIG. 3, the main body 110 (here, defining one or more T-sections 110) may include one or more spacers 112, one or more coupling plates 114, an elongate portion 116, and an end plate 118.

The end plate 118 may be attached to an end of the elongate portion 116 and may be positioned substantially perpendicular to the elongate portion 116.

The elongate portion 116 may have an exemplary length 120 (shown in FIG. 5) in a range of from 510 millimeters to 710 millimeters, preferably from 550 millimeters to 670 millimeters, and most preferably from 590 millimeters to 640 millimeters.

The elongate portion 116 may have an exemplary height 122 (shown in FIG. 6) in a range of from 103 millimeters to 303 millimeters, preferably from 143 millimeters to 263 millimeters, and most preferably from 183 millimeters to 223 millimeters.

The end plate 118 may have an exemplary width 124 (shown in FIG. 7) in a range of from 52 millimeters to 252 millimeters, preferably from 92 millimeters to 212 millimeters, and most preferably from 132 millimeters to 172 millimeters.

The end plate 118 may have an exemplary height 126 (shown in FIG. 7) in a range of from 103 millimeters to 303 millimeters, preferably from 143 millimeters to 263 millimeters, and most preferably from 183 millimeters to 223 millimeters.

Figure 4:
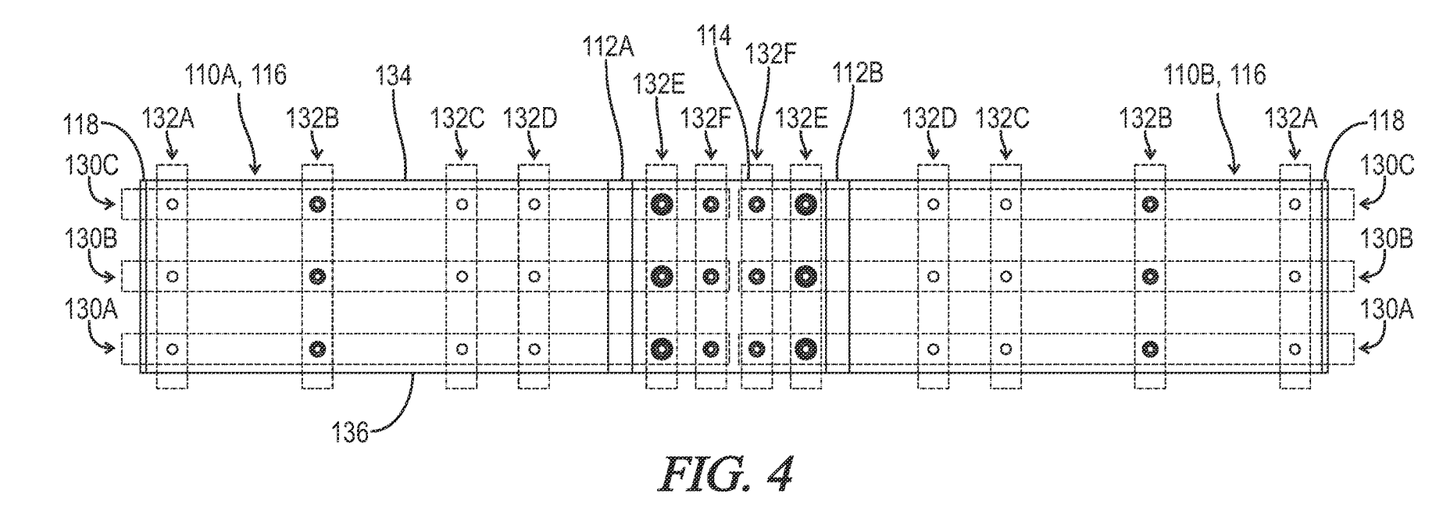
FIG. 4 is a front view of the partial exemplary embodiment of the storage shelf moving device of FIG. 3.
Figure 5:
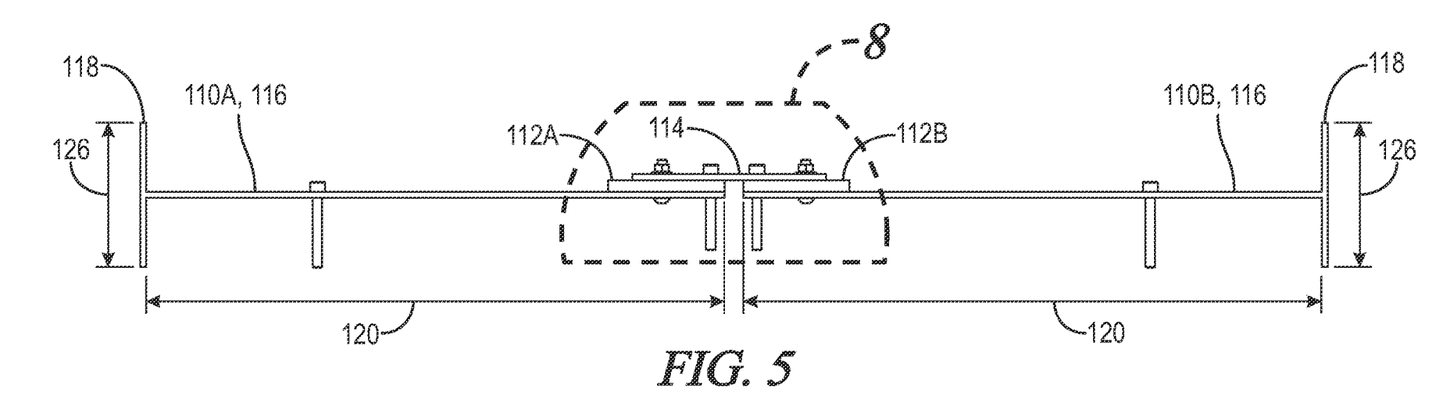
FIG. 5 is a top view of the partial exemplary embodiment of the storage shelf moving device of FIG. 3.
Figure 6:
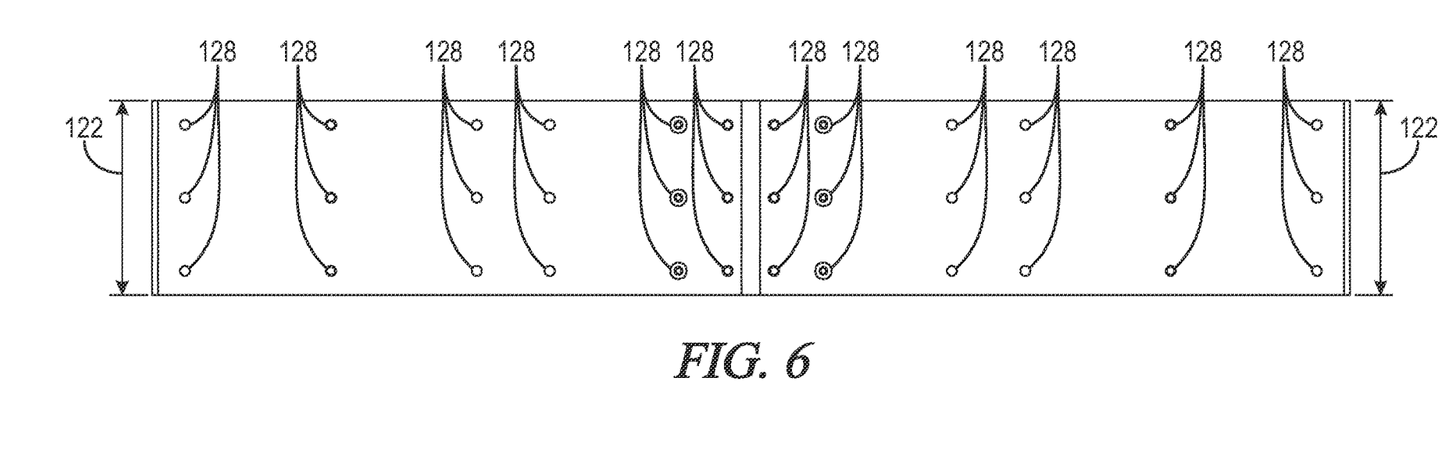
FIG. 6 is a rear view of the partial exemplary embodiment of the storage shelf moving device of FIG. 3.

Referring now to FIG. 4, the elongate portion 116 of each of the one or more T-sections 110 may include a plurality of apertures 128 configured to receive fasteners, and illustrated as holes 128.

The plurality of holes 128 may be arranged in a hole pattern. The hole pattern may include a plurality of rows 130 and a plurality of columns 132.

The plurality of rows 130 may include a lower row 130A, a middle row 130B, and an upper row 130C.

The middle row 130B may be located generally halfway between an upper edge 134 and a lower edge 136 of the elongate portion 116.

The lower row 130A and upper row 130C may be located on either side of the middle row 130B.

The upper row 130C may be located closer to the upper edge 134 than to the lower edge 136 of the elongate portion 116.

The lower row 130A may be located closer to the lower edge 136 than to the upper edge 134 of the elongate portion 116.

The lower row 130A and upper row 130C may be located a distance from the middle row 130B in a range of from 70 millimeters to 82 millimeters, preferably from 72 millimeters to 80 millimeters, and most preferably from 74 millimeters to 78 millimeters.

The plurality of columns 132 may include a first column 132A, a second column 132B, a third column 132C, a fourth column 132D, a fifth column 132E, and a sixth column 132F.

The first column 132A may be located a distance from the end of the elongate portion 116 in a range of from 18 millimeters to 38 millimeters, preferably from 22 millimeters to 34 millimeters, and most preferably from 26 millimeters to 30 millimeters. The first column 132A may be located a distance from the second column 136B in a range of from 122 millimeters to 182 millimeters, preferably from 132 millimeters to 172 millimeters, and most preferably from 142 millimeters to 162 millimeters.

The second column 132B may be located a distance from the third column 136C in a range of from 122 millimeters to 182 millimeters, preferably from 132 millimeters to 172 millimeters, and most preferably from 142 millimeters to 162 millimeters.

The third column 132C may be located a distance from the fourth column 136D in a range of from 46 millimeters to 106 millimeters, preferably from 56 millimeters to 96 millimeters, and most preferably from 66 millimeters to 86 millimeters.

The fourth column 132D may be located a distance from the fifth column 136E in a range of from 104 millimeters to 164 millimeters, preferably from 114 millimeters to 154 millimeters, and most preferably from 124 millimeters to 144 millimeters.

The fifth column 136E may be located a distance from the sixth column 136F in a range of from 21 millimeters to 81 millimeters, preferably 31 millimeters to 71 millimeters, and most preferably from 41 millimeters to 61 millimeters.

Figure 7:
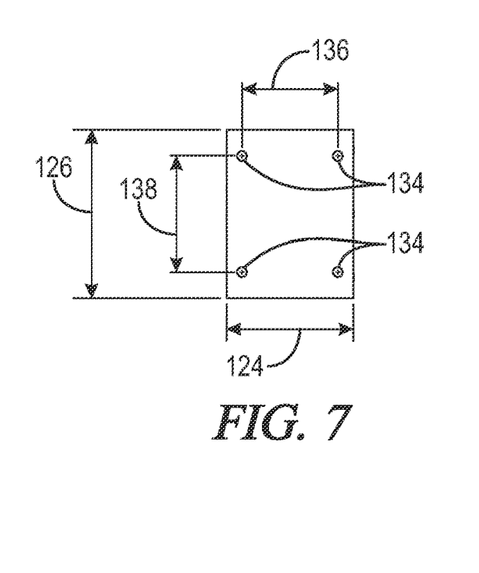
FIG. 7 is a right side view of the end plate of the partial exemplary embodiment of the storage shelf moving device of FIG. 3.
Figure 8:
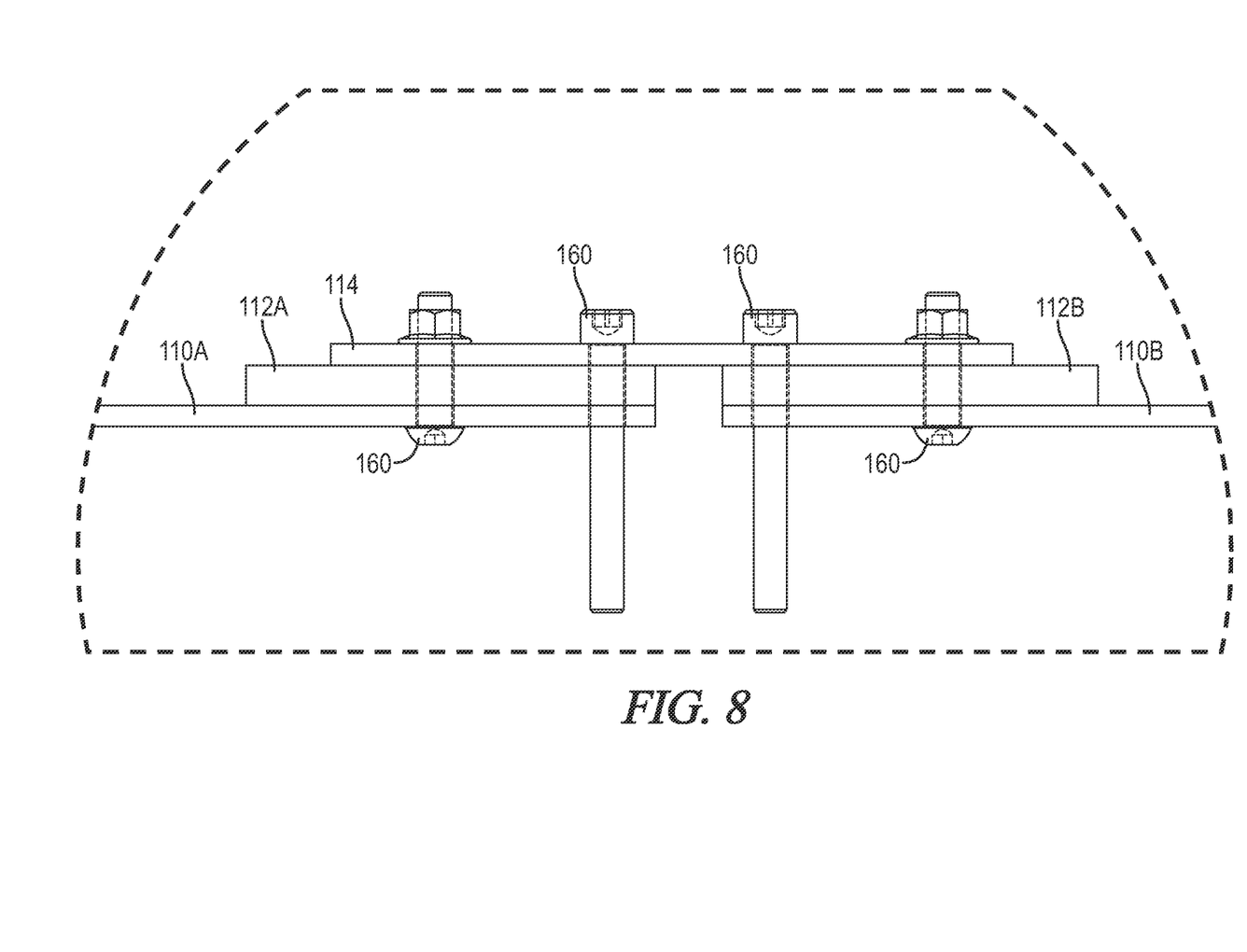
FIG. 8 is a detailed top view of the partial exemplary embodiment of the storage shelf moving device of FIG. 3.

Referring now to FIG. 7, the end plate 118 may include a plurality of holes 134 defined through the end plate 118.

The plurality of holes 134 of the end plate 118 may include four (4) holes generally located in a rectangular pattern having a width 136 in a range of from 85 millimeters to 145 millimeters, preferably from 95 millimeters to 135 millimeters, and most preferably from 105 millimeters to 125 millimeters, and having a height 138 in a range of from 110 millimeters to 170 millimeters, preferably from 120 millimeters to 160 millimeters, and most preferably from 130 millimeters to 150 millimeters.

Figure 10:
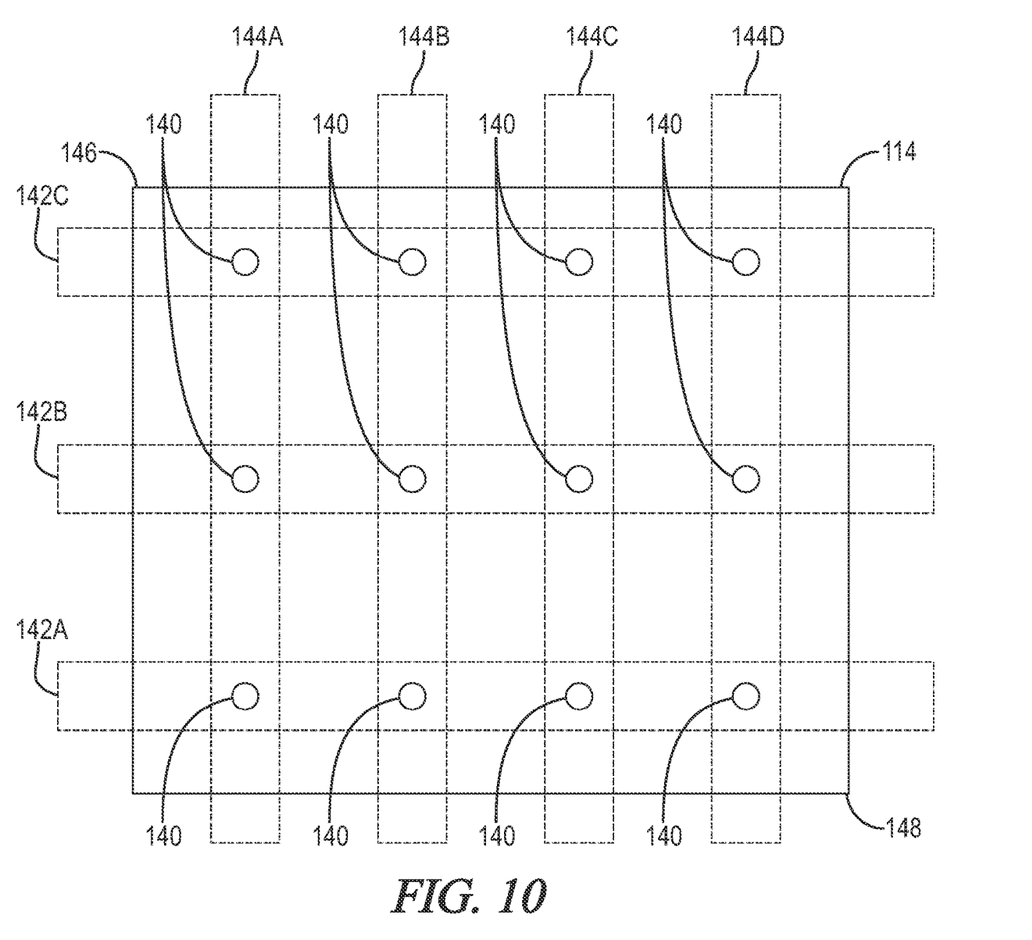
FIG. 10 is a front view of a coupling plate of the storage shelf moving device of FIG. 2 in accordance with the present disclosure.

Referring now to FIG. 10, the one or more coupling plates 114 may include a plurality of holes 140 arranged in a hole pattern.

The hole pattern may include a plurality of rows 142 and a plurality of columns 144.

The plurality of rows 142 may include a lower row 142A, a middle row 142B, and an upper row 144C.

The middle row 142B may be located generally halfway between an upper edge 146 and a lower edge 148 of the coupling plate 114.

The lower row 142A and upper row 142C may be located on either side of the middle row 142B.

The upper row 142C may be located closer to the upper edge 146 than to the lower edge 148 of the coupling plate 114.

The lower row 142A may be located closer to the lower edge 148 than to the upper edge 146 of the coupling plate 114.

The lower row 142A and upper row 142C may be located a distance from the middle row 142B in a range of from 70 millimeters to 82 millimeters, preferably from 72 millimeters to 80 millimeters, and most preferably from 74 millimeters to 78 millimeters.

The plurality of columns 144 may include a first column 144A, a second column 144B, a third column 144C, and a fourth column 144D.

The second column 144B and third column 144C may be located on opposite sides of a center of the coupling plate 114 a distance of between 9 millimeters to 39 millimeters, preferably 14 millimeters to 34 millimeters, and most preferably between 19 millimeters to 29 millimeters.

The first column 144A and fourth column 144D may be located on opposite sides of a centerline of the coupling plate 114 a distance of between 45 millimeters to 105 millimeters, preferably 55 millimeters to 95 millimeters, and most preferably between 65 millimeters to 85 millimeters.

Figure 9:
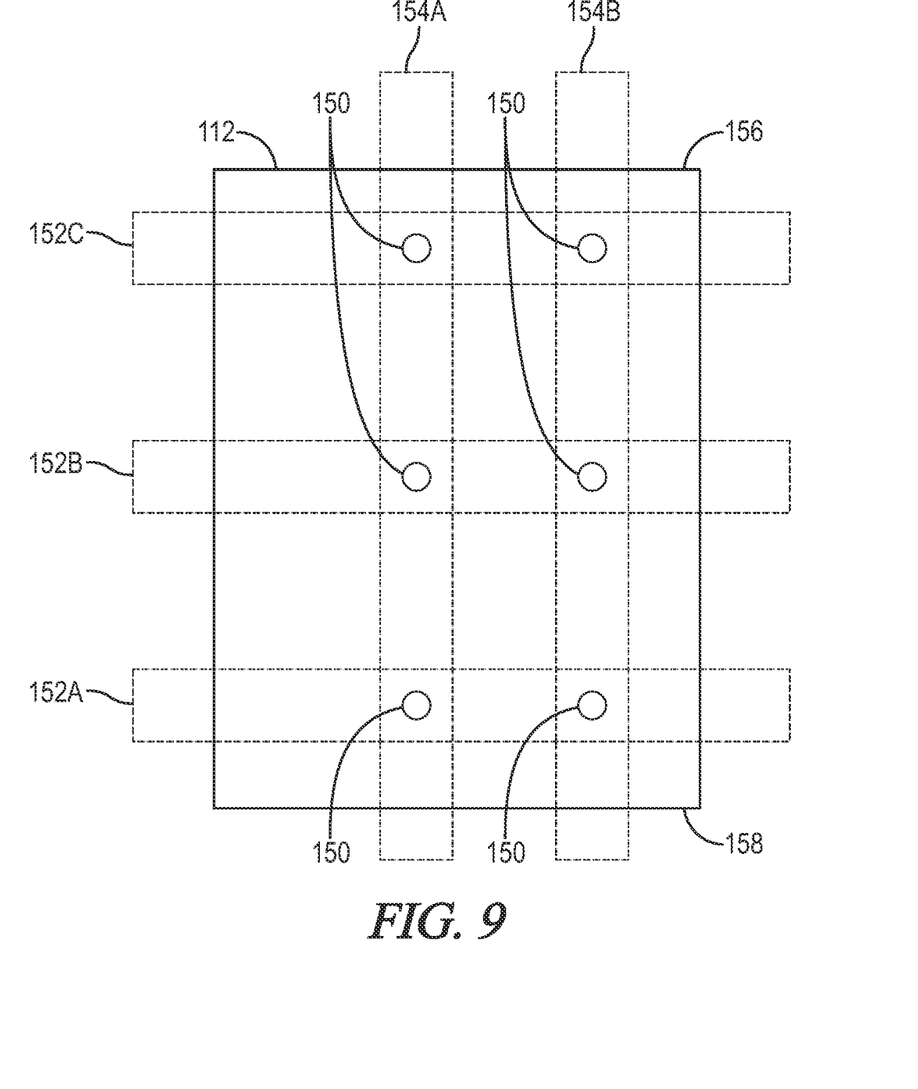
FIG. 9 is a front view of an exemplary spacer of the storage shelf moving device of FIG. 2.

Referring now to FIG. 9, each of the one or more spacers 112 may include a plurality of holes 150 defined therethrough and arranged in a hole pattern.

The hole pattern may include a plurality of rows 152 and a plurality of columns 154.

The plurality of rows 152 may include a lower row 152A, a middle row 152B, and an upper row 154C.

The middle row 152B may be located generally halfway between an upper edge 156 and a lower edge 158 of the spacer 112.

The lower row 152A and upper row 152C may be located on either side of the middle row 152B.

The upper row 152C may be located closer to the upper edge 156 than to the lower edge 158 of the spacer 112.

The lower row 152A may be located closer to the lower edge 158 than to the upper edge 16 of the spacer 112.

The lower row 152A and upper row 152C may be located a distance from the middle row 152B in a range of from 70 millimeters to 82 millimeters, preferably from 72 millimeters to 80 millimeters, and most preferably from 74 millimeters to 78 millimeters.

The plurality of columns 154 of the spacer 112 may include a first column 154A and a second column 154B.

The first column 154A may be located a distance from the second column 154B of from 21 millimeters to 81 millimeters, preferably 31 millimeters to 71 millimeters, and most preferably from 41 millimeters to 61 millimeters.

Referring now to FIG. 2, each of the plurality of holes 128 of the elongate portion 116, the plurality of holes 134 of the end plate 118, the plurality of holes 140 of the coupling plate 114, and the plurality of holes 150 of the spacer 112 may include a diameter in range of from 8 millimeters to 14 millimeters, preferably from 9 millimeters to 13 millimeters, and most preferably from 10 millimeters to 12 millimeters.

The exemplary measurements provided are representative of one optional embodiment of the moving device 100 in accordance with the present disclosure. Other optional embodiments of the moving device 100 may have different measurements within the spirit and scope of the present disclosure.

The moving device 100 may further include a wheel assembly 170.

The wheel assembly 170 may include an extendable support 172, a wheel axle 174, a wheel 176, and a wheel assembly coupler 178.

The wheel axle 174 may be coupled to a lower end of the extendable support 172.

The wheel 176 may be rotatably coupled to the wheel axle 174 and may include a caster wheel for supporting heavy loads.

A relative extension of the extendable support 172 may be responsive to actuation by an actuator 180, for example to selectively adjust a state of the moving device 100 between a first state (e.g., associated with a fully lowered position of a shelving unit coupled to the moving device 100), a second state (e.g., associated with a fully raised position of a shelving unit coupled to the moving device 100), and any one or more states there between.

In optional embodiments, such as the embodiment shown in FIG. 2, the extendable support 172 may be adjusted manually, for example through rotation of a hand crank as or associated with the actuator 180.

In other optional embodiments, the extendable support 172 may include a linear actuator, such as a hydraulic cylinder or an electrically powered linear actuator.

The wheel assembly coupler 178 may be fixed to the extendable support 172 and operable to couple to the end plate 118 of the T-Sections 110. Namely, the wheel assembly coupler 178 may include a plurality of holes operable to align with the plurality of holes 134 of the end plate 118 of the T-Sections 110.

While an exemplary hole pattern of the end plate 118 is shown in FIG. 7, any hole pattern may be used that is capable of coupling the wheel assembly 170 to the end plate 118.

The extendable support 172 may be operable to adjust a height of the wheel assembly coupler 178 relative to a ground surface.

Figure 11:
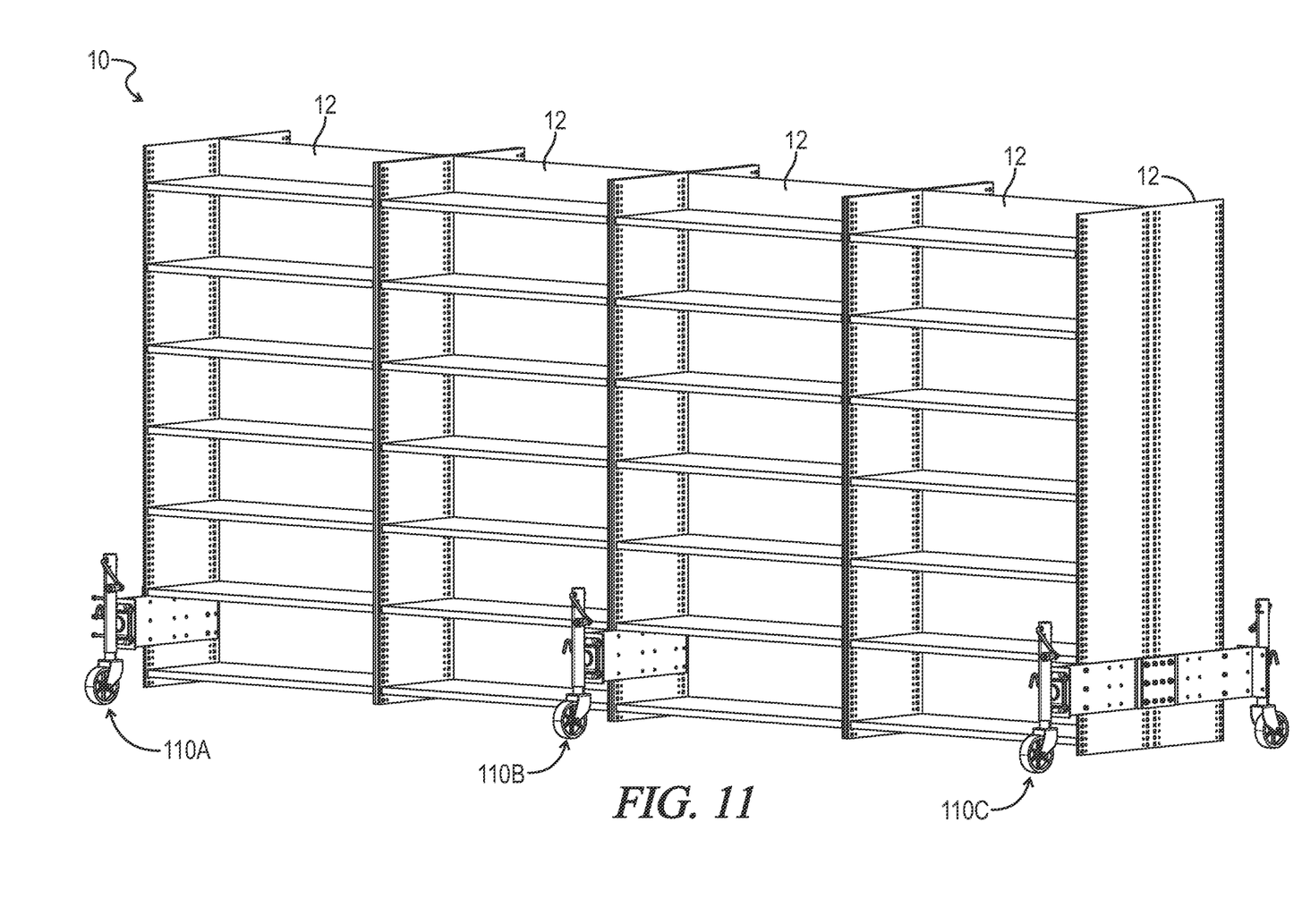
FIG. 11 is a perspective view representing an exemplary embodiment of a shelf moving system coupled to the prior art modular storage shelf of FIG. 1 in accordance with the present disclosure.
Figure 12:
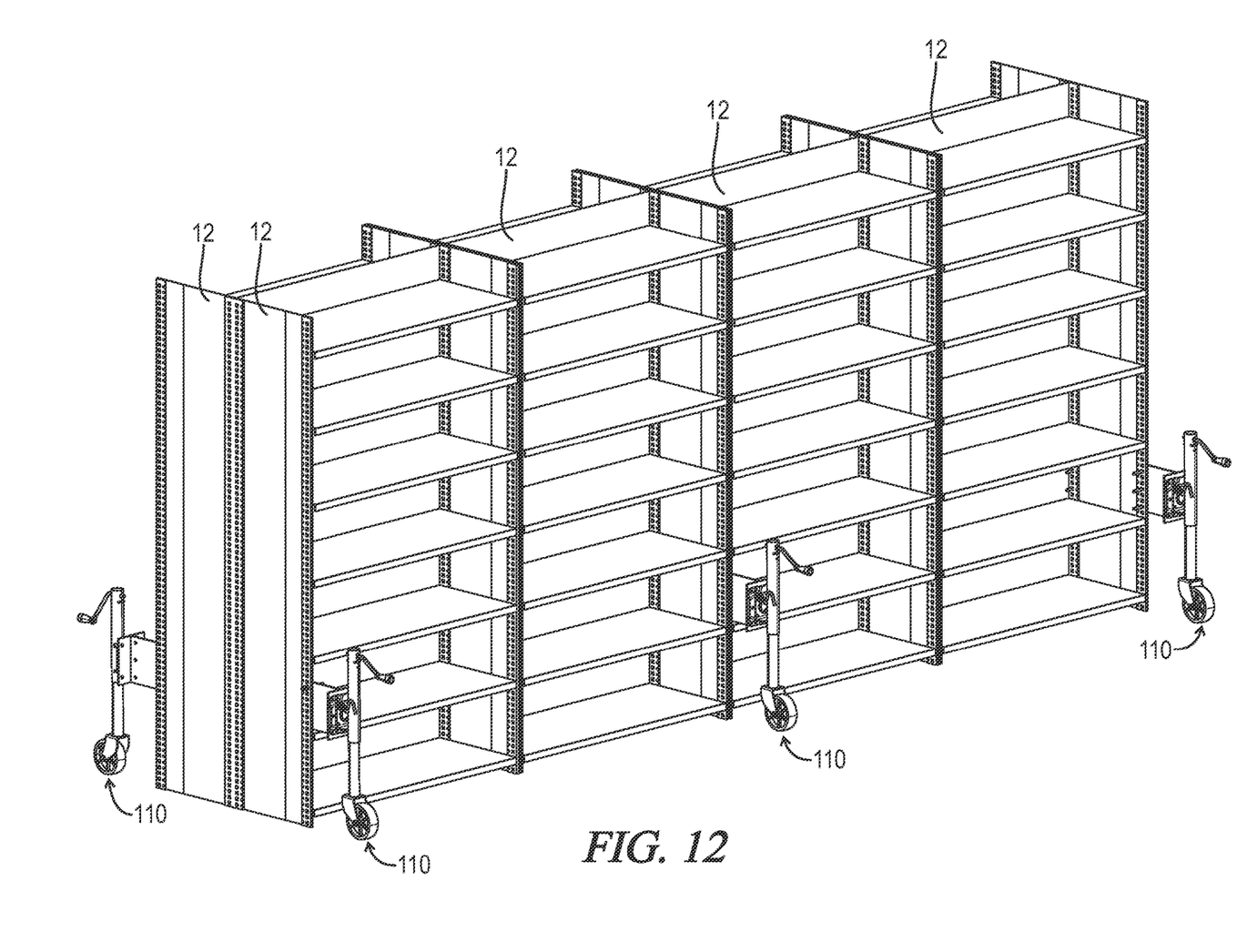
FIG. 12 is an alternative perspective view representing the exemplary embodiment of the shelf moving system of FIG. 11 in accordance with the present disclosure.

An optional embodiment of a storage shelf moving system is illustrated in FIGS. 11 and 12. The storage shelf moving system includes a plurality of moving devices 100, with the moving devices 100 of FIG. 12 being individually indicated by 100A, 100B, and 100C.

In the optional embodiment, moving devices 100A and 100B include simply the T-Section 110 and a wheel assembly 170.

The wheel assembly 170 may be attached to the end plate 118 of the T-Section 110 via a plurality of fasteners.

The moving devices 100A and 100B may be coupled to an interior edge of the left or right sides 14, 16.

In other optional embodiments, the moving devices 100A and 100B may be coupled to an exterior edge of the left or right sides 14, 16.

Any of the plurality of holes 128 defined in the elongate portion 116 of the T-Section 110 may align to any of the plurality of holes 24 defined in the shelving unit 12.

Fasteners may extend through the plurality of holes 128 defined in the elongate portion 116 of the T-Section 110 and the plurality of holes 24 defined in the shelving unit 12 to couple the moving device 100 to the shelving unit 12.

Another optional embodiment of the moving device 100 is indicated in FIG. 12 as 100C. The moving device 100C includes two T-Sections 110, two spacers 112, and the coupling plate 114 coupleable to one another to define an extended and coplanar elongate portion 116 between opposing end plates 118.

The moving device 100C includes a first T-Section 110A, a second T-Section 110B, a first spacer 112A, a second spacer 112B, and a coupling plate 114.

The first T-Section 110A may abut the first spacer 112A, and the first spacer 112A may abut the coupling plate 114.

The second T-Section 110B may abut the second spacer 112B, and the second spacer 112B may abut the coupling plate 114.

A plurality of fasteners 160 may extend through the first T-Section 110A, the first spacer 112A, and the coupling plate 114, and thus fix the first T-Section 110A, first spacer 112A, and coupling plate 114 together.

A plurality of fasteners 160 may extend through the second T-Section 110B, the second spacer 112B, and the coupling plate 114, and thus fix the second T-Section 110B, second spacer 112B, and coupling plate 114 together. In this way, the first and second T-Sections 110A, 110B may be fixed relative to each other.

The fifth column 132E of the first T-Section 110A may be operable to align with the first column 154A of the first spacer 112A and the first column 144A of the coupling plate 114.

The sixth column 132F of the first T-Section 110A may be operable to align with the second column 154B of the first spacer 112A and the second column 144B of the coupling plate 114. The sixth column 132F of the second T-Section 110B may be operable to align with the second column 154B of the second spacer 112B and the third column 144C of the coupling plate 114.

The fifth column 132E of the second T-Section 110B may be operable to align with the first column 154A of the second spacer 112B and the fourth column 144D of the coupling plate 114.

A plurality of fasteners may extend through the holes of the fifth column 132E of the first T-Section 110A, the first column 154A of the first spacer 112A, and the first column 144A of the coupling plate 114 to secure the first T-Section 110A to the coupling plate 114.

A plurality of fasteners may extend through the sixth column 132F of the second T-Section 110B, the second column 154B of the second spacer 112B, and the third column 144C of the coupling plate 114 to secure the second T-Section 110B to the coupling plate 114.

A plurality of fasteners may extend through the sixth column 132F of the first T-Section 110A, the second column 154B of the first spacer 112A, and the second column 144B of the coupling plate 114, and a plurality of fasteners may extend through the sixth column 132F of the second T-Section 110B, the second column 154B of the second spacer 112B, and the third column 144C of the coupling plate 114, and into an outer edge of the left or right sides 14, 16 of the shelving units 12.

Further, a plurality of fasteners may extend through the elongate portion 116 of the T-Section 110 and into the outer edge of the left or right sides 14, 16 of the shelving units 12, such as through the second column 132B of the plurality of holes 128.

Thus, the moving device 100C may be connected to an exterior edge of two shelving units 12 that are coupled to one another.

In use, a user may utilize the storage shelf moving system to move a conventional modular storage shelf 10 having goods on the plurality of shelves 22 from a current location to a target location. The user does not need to remove the goods from the plurality of shelves 22, and thus may leave the goods on the plurality of shelves 22. The user may then connect a desired number of moving devices 100 to the storage shelf 10.

The number and location of the moving devices 100 used may depend on the size and configuration of the storage shelf 10.

The user may place each moving device 100 such that one or more of the plurality of holes 128 of the elongate portion 116 of the T-Sections 110 aligns with the plurality of holes 24 of the shelving units 12. The user may then position fasteners through the T-Sections 110 and the shelving units 12 to couple the moving devices 100 to the shelving units 12.

Once the entirety of the desired moving devices 100 are coupled to the storage shelf 10, the user may then extend the extendable supports 172 of the wheel assemblies 170.

Preferably, each of the extendable supports 172 of the wheel assemblies 170 are extended in unison such that the storage shelf 10 maintains a level position.

Once the extendable supports 172 of the wheel assemblies 170 have been extended and the storage shelf 10 is raised in the air, the user may push or pull the storage shelf 10 from the current location to the target location. Once at the target location, the user may then lower the extendable supports 172 of the wheel assemblies 170 to lower the storage shelf 10 to the ground.

Preferably, each of the extendable supports 172 of the wheel assemblies 170 are lowered in unison such that the storage shelf 10 maintains a level position.

Various elements of the moving device 100 may be modular such that they may be used in a variety of configurations. For example, the same T-Section 110 may be used on the left side 14 of the shelving unit 12 or the right side 16 of the shelving unit 12. The T-Section 110 may further be mounted flipped about a horizontal axis and couple to the shelving unit 12 in either configuration.

The previous detailed description has been provided for the purposes of illustration and description. Thus, although there have been described particular embodiments of a new and useful invention, it is not intended that such references be construed as limitations unless otherwise explicitly recited in the claims.

What is claimed is:

1. A storage shelf moving device comprising:
a main body including a first planar portion and a second planar portion coupled to and oriented substantially perpendicular to the first planar portion, the first planar portion having a plurality of apertures extending there through and configured to receive fasteners, wherein the first planar portion is operable to be selectively coupled to a side of a shelving unit having a corresponding plurality of apertures by inserting fasteners through the plurality of apertures of the sides of the shelving unit and corresponding plurality of apertures of the first planar portion;
a wheel assembly coupled to the main body, the wheel assembly including an extendable support and a wheel rotatably mounted at a lower end of the extendable support; and
an actuator associated with the extendable support and configured to selectively drive the extendable support between at least a first state and a second state, wherein the storage shelf moving device is operable to lift the storage shelf coupled thereto from a ground surface when the extendable support is extended from the first state.

2. The device of claim 1, wherein the main body comprises a T-section, with a first end of the second planar portion and a second end of the second planar portion opposing the first end, and a portion between the first end and the second end coupled to the first planar portion.

3. The device of claim 1, wherein the main body comprises an L-section, with a first end of the second planar portion coupled to the first planar portion.

4. The device of claim 1, wherein the actuator comprises a hand crank.

5. The device of claim 1, wherein the actuator comprises a linear actuator configured to hydraulically drive the extendable support between the first and second states.

6. The device of claim 1, wherein the actuator comprises a linear actuator configured to pneumatically drive the extendable support between the first and second states.

7. A storage shelf moving system comprising:
a plurality of moving devices, each of the plurality of moving devices including:
a main body including a first planar portion and a second planar portion coupled to and oriented substantially perpendicular to the first planar portion, the first planar portion having a plurality of apertures extending there through and configured to receive fasteners, wherein the first planar portion is operable to be selectively coupled to a side of a shelving unit having a corresponding plurality of apertures by inserting fasteners through the plurality of apertures of the sides of the shelving unit and corresponding plurality of apertures of the first planar portion;
a wheel assembly coupled to the main body, the wheel assembly including an extendable support and a wheel rotatably mounted at a lower end of the extendable support; and
an actuator associated with the extendable support and configured to selectively drive the extendable support between at least a first state and a second state, wherein the storage shelf moving device is operable to lift the storage shelf coupled thereto from a ground surface when the extendable support is extended from the first state.

8. The system of claim 7, wherein at least a first moving device and a second moving device of the plurality of moving devices are coupled together via their respective main bodies.

9. The system of claim 8, wherein the first planar portion of the first moving device and the first planar portion of the second moving device are coupled together via a coupling plate to define an extended and coplanar elongate portion between the second planar portion of the first moving device and the second planar portion of the second moving device.

10. The system of claim 7, wherein for at least one of the plurality of moving devices, the main body comprises a T-section, with a first end of the second planar portion and a second end of the second planar portion opposing the first end, and a portion between the first end and the second end coupled to the first planar portion.

11. The system of claim 7, wherein for each of the plurality of moving devices, the main body comprises an L-section, with a first end of the second planar portion coupled to the first planar portion.

12. The system of claim 7, wherein for each of the plurality of moving devices, the actuator comprises a hand crank.

13. The system of claim 7, wherein for each of the plurality of moving devices, the actuator comprises a linear actuator configured to hydraulically drive the extendable support between the first and second states.

14. The system of claim 7, wherein for each of the plurality of moving devices, the actuator comprises a linear actuator configured to pneumatically drive the extendable support between the first and second states.

15. A method of moving a storage shelf from an initial location on a ground surface to a target location on the ground surface, the method comprising:

providing a plurality of moving devices, each of the plurality of moving devices including a main body having a first planar portion and a second planar portion oriented substantially perpendicular to the first planar portion, the first planar portion having a plurality of apertures extending there through and configured to receive fasteners, a wheel assembly coupled to the main body, the wheel assembly including an extendable support and a wheel axle rotatably mounted at a lower end of the extendable support;

coupling the plurality of moving devices, via the respective first planar portions thereof, to sides of the storage shelf by extending fasteners through apertures in the sides of the storage shelf and the plurality of apertures of the first planar portion, wherein the extendable supports for each of the plurality of moving devices are in a first state;

actuating the extendable supports for each of the plurality of moving devices from the first state to a second state, wherein the storage shelf is lifted from the ground surface;

moving the storage shelf to the target location;

actuating the extendable supports for each of the plurality of moving devices from the second state to the first state, wherein the storage shelf is supported by the ground surface; and decoupling the plurality of moving devices from the sides of the storage shelf.

\* \* \* \* \*